United States Patent
Wing

(10) Patent No.: US 6,229,230 B1
(45) Date of Patent: May 8, 2001

(54) TACTILE SIMULATOR

(76) Inventor: Alan Miles Wing, 80 Thornton Road, Girton, Cambridge CB3 0NN (GB)

( * ) Notice: Subject to any disclaimer, the term of this patent is extended or adjusted under 35 U.S.C. 154(b) by 0 days.

(21) Appl. No.: 09/423,137
(22) PCT Filed: Jul. 2, 1998
(86) PCT No.: PCT/GB98/01942
  § 371 Date: Jan. 27, 2000
  § 102(e) Date: Jan. 27, 2000
(87) PCT Pub. No.: WO99/01717
  PCT Pub. Date: Jan. 14, 1999

(30) Foreign Application Priority Data

Jul. 3, 1997 (GB) .................................................. 9713966

(51) Int. Cl.[7] .......................... H02K 41/00; G06F 17/00
(52) U.S. Cl. ......................... 310/12; 273/148 R; 341/20
(58) Field of Search .................................. 310/12, 13, 14, 310/17, 23, 28, 75 R, 112; 273/148 R; 341/20; 901/2, 15; 74/471 R

(56) References Cited

U.S. PATENT DOCUMENTS

| | | | |
|---|---|---|---|
| 4,680,523 | 7/1987 | Goumas | 318/685 |
| 5,052,736 | 10/1991 | Loncaric | 294/106 |
| 5,200,679 | 4/1993 | Graham | 318/568.16 |
| 6,002,184 | * 12/1999 | Delson et al. | 310/14 |

FOREIGN PATENT DOCUMENTS 2 058 009   4/1981   (GB).

\* cited by examiner

Primary Examiner—Nestor Ramirez
Assistant Examiner—Judson H. Jones

(57) ABSTRACT

A tactile simulator has an array of actuators (1), with each actuator including a linear motor, the movable thrust rod (6) of which carries a force sensor (5). The position of each thrust rod (6) is sensed by a corresponding position sensor (8). Each actuator (1) also includes a corresponding controller (12) which drives the motor in dependence upon signals from the force sensor (5) and the position sensor (8). An array controller (13) controls the individual element controllers (12) in order to drive the thrust rods (6). The simulator can be used in a display mode, in which the thrust rods (6) are driven to occupy positions corresponding to a surface stored in a database, or in a scan mode, in which the thrust rods (6) are driven in to contact with a surface to be registered or recorded.

8 Claims, 4 Drawing Sheets

TACTILE SIMULATOR

Figure 1:
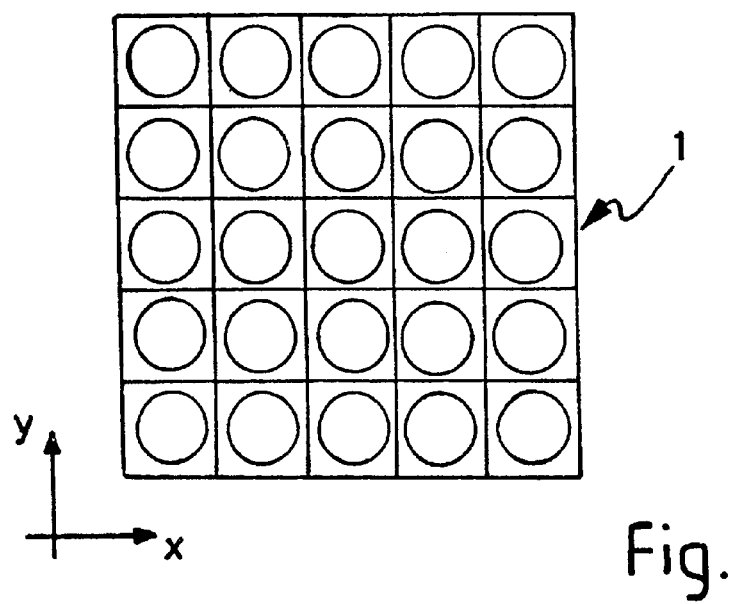

This invention relates to a tactile simulator.

According to the invention a tactile simulator comprises an array of a plurality of actuators with each actuator comprising:
(a) a linearly movable member with an operable element,
(b) a motor for driving the movable member,
(c) a position sensor operative to produce a first output signal representative of the position of the movable member,
(d) a force sensor operative to produce a second output signal representative of the force applied to the operable element in the direction of movement of the movable member, and
(e) a controller operative to drive the motor in dependence upon the first and second output signals
and control means responsive to the output signals in order to control the motors so that the elements respond to the physical characteristics of spatial position and deformability.

Preferably, the motors are electrically driven linear motors having thrust rods guided for movement in parallel directions, and in a preferred embodiment the array is a rectangular array with mutually perpendicular length and width axes both of which are orthogonal to the direction of movement of the thrust rods.

A simulator according to the invention may operate in a display mode in which information from a local or remote database drives the control means to cause the operable elements to occupy positions determined by the information stored in the database. The array of operable elements thus occupy positions which correspond to a surface stored in the database. Moreover, the deformability of each operable element, i.e. its stiffness or resistance to movement is, also representative of the stored surface so that an observer putting his fingers on the operable elements feels the shape and resilience of the surface stored in the database.

The information from the database may be time-varying, so that the operable elements give a time-varying display of position and force characteristics and the control means may have algorithms which respond in a required way to particular outputs from the array. For example, if the observer displaces certain elements more than a certain amplitude or applies forces more than a certain magnitude the control means could respond by reporting that such a displacement or force would break the stored surface.

Another mode of operation of a tactile simulator according to the invention is in a scan mode. In this case the operable elements are driven into contact with a surface to be registered or recorded, the output of the control means being fed to a local or remote database which stores the position and force signals for subsequent retrieval. The surface to be registered may have characteristics of position and force which are time-varying, so that the information stored is dynamic.

By using two tactile simulators, each according to the invention and positioned at remote locations, teleoperation is possible.

Figure 2:
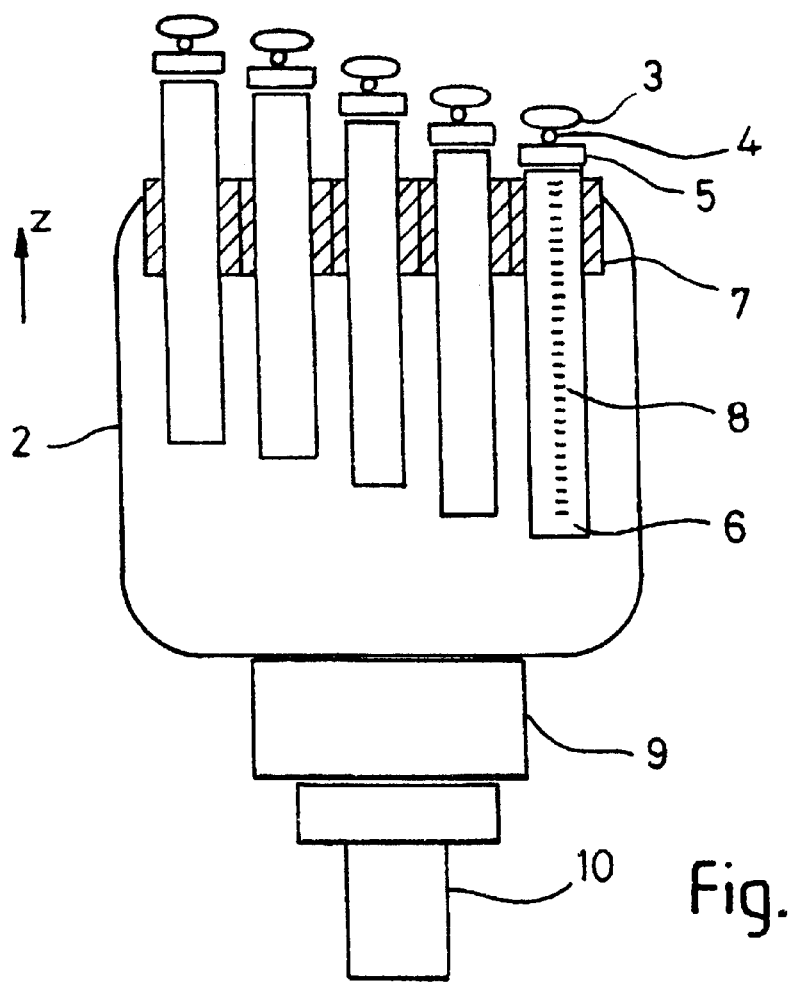
Figure 3:
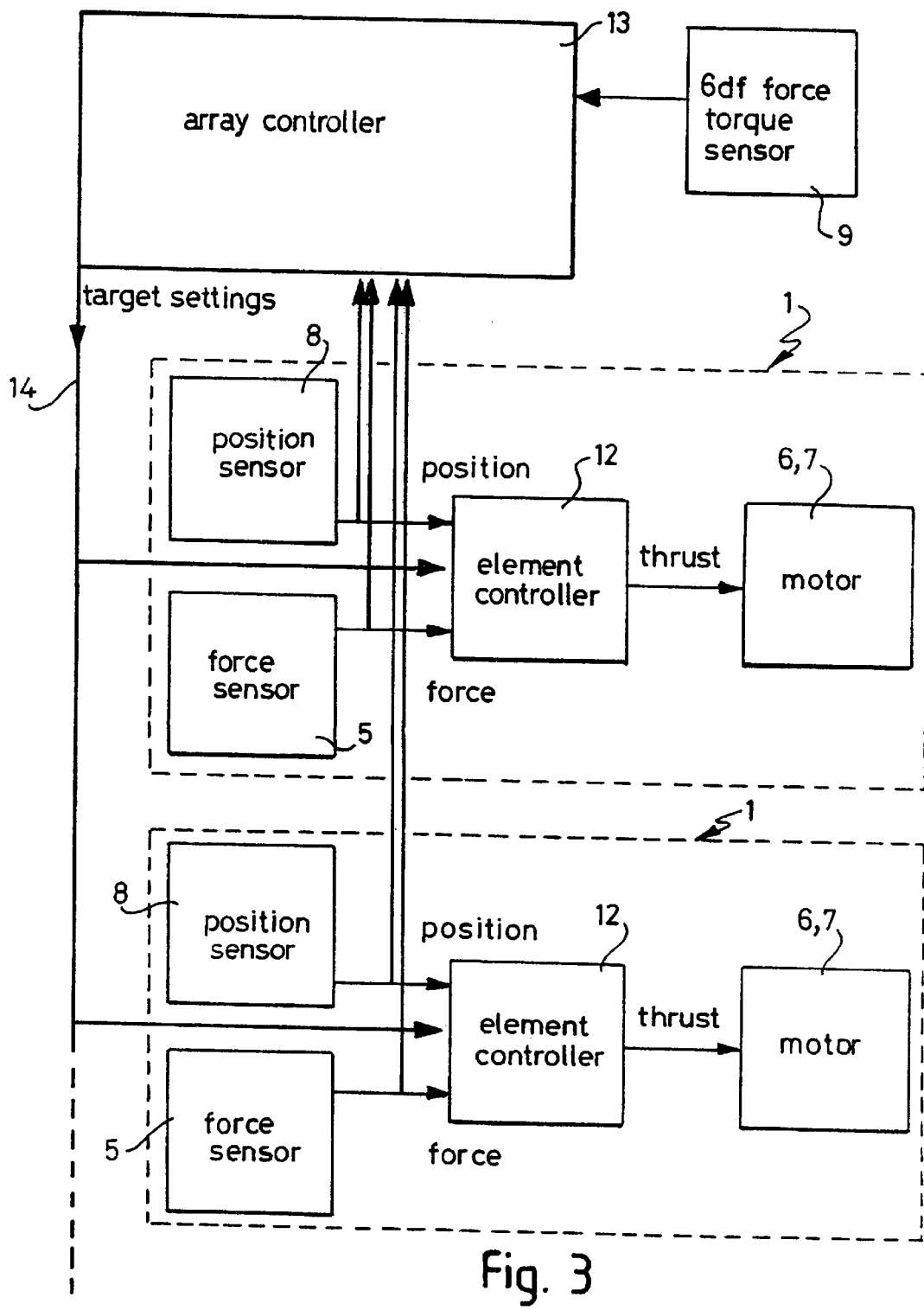
Figure 4:
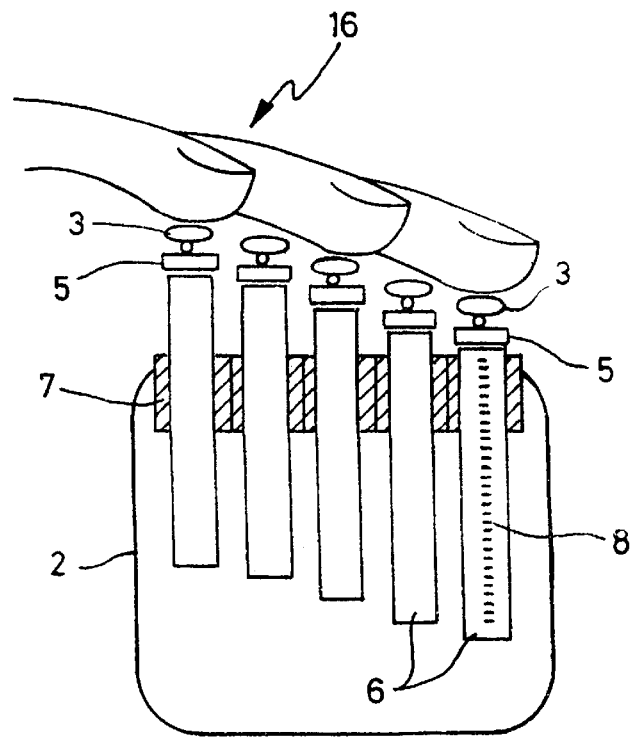
Figure 4:
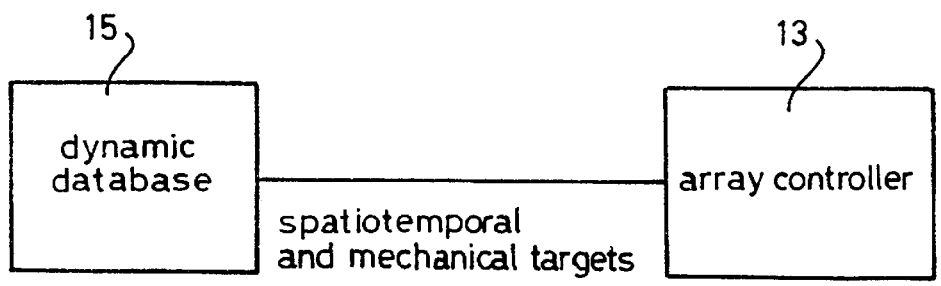
Figure 5:
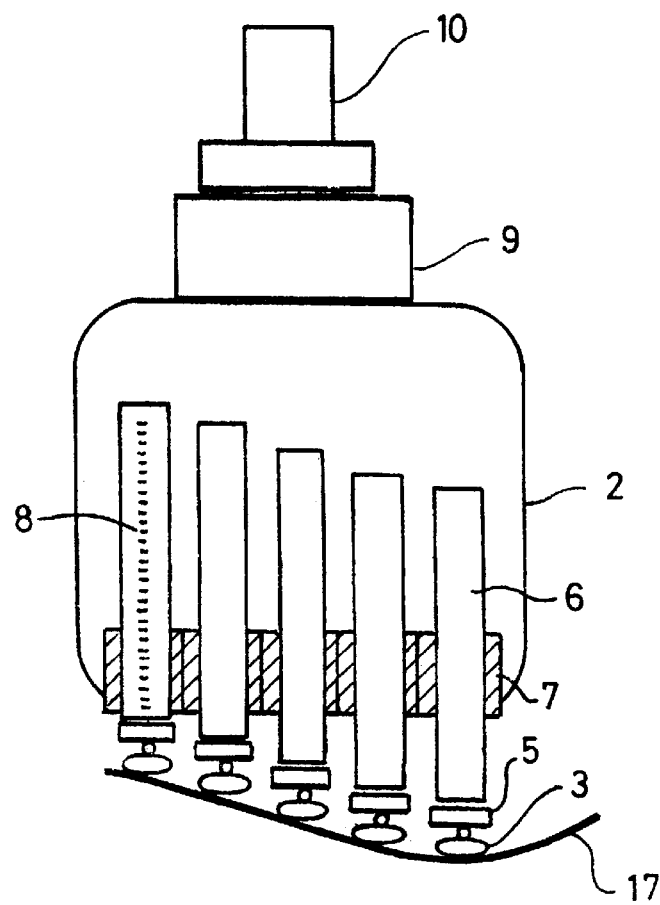
Figure 5:
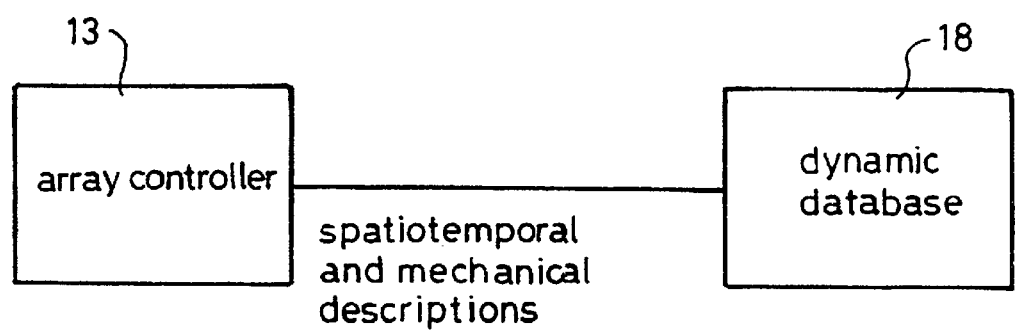

The invention will now be described, by way of example, with reference to the accompanying drawings, in which:

FIG. 1 is a plan view of an actuator array of a tactile simulator according to the invention, FIG. 2 is a diagrammatic side view of the actuator array, FIG. 3 is a schematic block diagram of the tactile simulator, FIG. 4 shows the tactile simulator being used in display mode, and FIG. 5 shows the tactile simulator being used in scan mode.

Referring to FIGS. 1 and 2, the tactile simulator comprises twenty-five actuators 1 arranged in a regular square five by five matrix, the two axes of which are referred to as the x and y axes. The twenty-five actuators 1 are mounted in a housing 2 (FIG. 2). Each actuator 1 comprises an end plate 3 mounted by means of a damped spring ball joint 4 on a force sensor 5 which is itself mounted on the end of a linearly movable member constituted by the thrust rod 6 of an electrically driven linear motor the stationary thrust block of which is shown at 7. It will be appreciated that the thrust rod 6 is guided for linear movement in a direction which is vertical in FIG. 2 and which is orthogonal to the x and y axes of the array. Each thrust rod 6 is thus movable along a z axis. Lateral or side thrusts on the rods 6 in the x y plane are resisted by the linear motor thrust blocks 7, optionally with additional bushes. The position of the thrust rod 6 is sensed by a position sensor 8 which produces a first electrical output signal which is accordingly representative of the position of the end plate 3. The force sensor 5 produces a second electrical output signal which is representative of the force to which the end plate 3 is subjected in the direction of the z axis.

The housing 2, carrying the array of actuators 1, is mounted on a force and torque sensor 9 having six degrees of freedom, these six degrees of freedom being forces along the x, y and z axes and torques about the x, y and z axes. The force and torque sensor 9 is mounted on a robot arm 10 having six degrees of freedom.

FIG. 3 shows a block diagram of the tactile simulator, the components of the actuators 1 being shown within the broken line boxes. In addition to the position sensor 8, the force sensor 5 and the linear motor already described, each actuator 1 also includes a controller 12 to which the output signals from the position sensor 8 and the force sensor 5 are fed, the controller 12 providing a thrust signal which drives the corresponding motor thrust rod 6 in dependence upon the position and force output signals. It will be appreciated that the drive applied to the thrust rods 6 alters the outputs of the position sensor 8 and force sensor 5 and that these altered signals are fed back to the controller 12, so that the simulator acts with feedback control. Further, the position and force output signals from the actuators are supplied to control means in the form of an array controller 13 producing an output 14 which is fed to the element controllers 12 in order to drive the thrust rods 6 of the motors.

FIG. 4 shows the tactile simulator used in display mode. A database 15 has stored therein information concerning the spatial positions and deformability of a surface. These characteristics are fed from the database to the array controller 13 which drives the element controllers 12 so that the end plates 3 are driven to positions representative of the positions commanded by the database. In addition, the deformability of the stored surface is reproduced by the end plates 3. Hence, when an observer's fingers 16 engage the end plates 3 the observer's fingers not only occupy a surface corresponding to the spatial characteristics of the surface stored but also feel a surface which has the same deformability as the surface stored in the database.

In the scan mode illustrated in FIG. 5 the end plates 3 engage a surface 17 to be registered and hence the signals reaching the array controller 13 are representative of the spatial position and deformability of the surface 17 to be registered. The actuators may operate under a positive bias to push gently on the surface 17. The array controller provides signals which are fed to a database 18 for storage, processing or onward transmission of the signals. The domed shape of the distal surface of each end plate facilities accurate and reliable engagement with a surface, both in the display mode and the scan mode.

It will be appreciated that in either the display mode or the scan mode the position and force signals may vary with time in order to provide dynamic operation and that scaling factors, either in size, time or both may be introduced. In either mode, appropriate algorithms in the array controller govern or influence operation, for example to compensate for gravity effects or acceleration of the array.

The end plates may be covered with a protective skin-like membrane to protect the moving parts of the array.

In scan mode, the tactile simulator may be used for:
(1) Shape and compliance registration for:
a) medical diagnosis
b) parcels in mail sorting
c) clothing or shoe design
d) soft fruit handling/picking
(2) Manipulation
a) massage; therapeutic etc
b) comformable gripper with even distribution of load with minimum local pressure points.

In display mode the tactile simulator may be used for:
(1) Dynamic database display
a) mirroring scanner information; on-line or recorded
b) mirroring information on visual display; with remote (e.g. other hand by analog or symbolic means), or local (e.g. force) control of exploration
(2) Manipulable display
a) controlling scanner
b) modifying database information.

Also, two tactile simulators according to the invention can be located at remote positions and linked by a telephone line or other line of communication, with one simulator acting in a scan mode and the other simulator acting in a display mode. This would enable an observer to feel a surface at a distance.

An important potential application is medical manipulation and diagnosis at a distance. The scanner may be placed on the body and used to gently probe soft tissue under direct control for diagnostic purposes. The information may be stored and replayed for second consultation and review purposes.

The described tactile simulator has ball joints 4 but these may be omitted, the end plates 3 then being mounted directly on the force sensors 5. In this case, the end plates may have a more pronounced dome shape at their distal ends than is illustrated in the drawings.

What is claimed is:

1. A tactile simulator comprising an array of a plurality of actuators with each actuator comprising:
   (a) a linearly moveable member with an operable element,
   (b) a motor for driving the movable member,
   (c) a position sensor operative to produce a first output signal representative of the position of the moveable member,
   (d) a force sensor operative to product a second output signal representative of the force applied to the operable element in the direction of movement of the movable member, and
   (e) a controller operative to drive the motor in dependence upon the first and second output signals
   and control means responsive to the output signals in order to control the motors so that the elements respond to the physical characteristics of spatial position and deformability, the actuators being arranged in a regular rectangular array with x-y coordinates, the linearly movable members being movable along a z axis orthogonal to the x and y directions.

2. A tactile simulator according to claim 1, wherein each of the motors is an electrically driven linear motor.

3. A tactile simulator according to claim 1, wherein the linearly movable members are guided for movement in parallel directions, the extremity of each movable member constituting the operable element.

4. A tactile simulator according to claim 1, wherein the array is mounted on a positioning device having six degrees of freedom, three linear and three rotational, so that the array can be positioned in a chosen position and orientation.

5. A tactile simulator according to claim 1, wherein the operable elements bear against a body so that the first and second output signals are representative of the characteristics of the body.

6. A tactile simulator according to claim 5, wherein the first and second output signals vary with time.

7. A tactile simulator according to claim 1, wherein the control means apply to the motors command signals which are representative of the characteristics of a remote body form.

8. A tactile simulator according to claim 1 and forming one of two such apparatuses in communication so that the array at one apparatus is moved in dependence on the movement of the array at the other apparatus.

* * * * *